(12) United States Patent
Osqueizadeh et al.

(10) Patent No.: US 10,761,736 B2
(45) Date of Patent: *Sep. 1, 2020

(54) METHOD AND APPARATUS FOR INTEGRATION OF NON-VOLATILE MEMORY

(71) Applicants: ATI Technologies ULC, Markham (CA); ADVANCED MICRO DEVICES, INC., Santa Clara, CA (US)

(72) Inventors: Nima Osqueizadeh, Markham (CA); Paul Blinzer, Bellevue, WA (US)

(73) Assignees: ADVANCED MICRO DEVICES, INC., Santa Clara, CA (US); ATI TECHNOLOGIES ULC, Markham, Ontario (CA)

(*) Notice: Subject to any disclaimer, the term of this patent is extended or adjusted under 35 U.S.C. 154(b) by 29 days.

This patent is subject to a terminal disclaimer.

(21) Appl. No.: 16/055,716

(22) Filed: Aug. 6, 2018

(65) Prior Publication Data

US 2018/0349057 A1 Dec. 6, 2018

Related U.S. Application Data

(63) Continuation of application No. 15/389,596, filed on Dec. 23, 2016, now abandoned.

(51) Int. Cl.
G06F 3/06 (2006.01)

(52) U.S. Cl.
CPC ............ *G06F 3/0611* (2013.01); *G06F 3/068* (2013.01); *G06F 3/0635* (2013.01); *G06F 3/0658* (2013.01); *G06F 3/0685* (2013.01)

(58) Field of Classification Search
None
See application file for complete search history.

(56) References Cited

U.S. PATENT DOCUMENTS

| | | | |
|---|---|---|---|
| 5,968,143 | A | 10/1999 | Chisholm et al. |
| 7,281,104 | B1 | 10/2007 | Tsypliaev et al. |
| 7,603,533 | B1 | 10/2009 | Tsypliaev et al. |
| 7,953,948 | B1 | 5/2011 | Dyatlov et al. |
| 8,996,781 | B2 | 3/2015 | Schuette et al. |
| 2005/0251617 | A1 | 11/2005 | Sinclair et al. |
| 2009/0203430 | A1 | 8/2009 | Peek |
| 2010/0191898 | A1 | 7/2010 | Kim et al. |
| 2011/0292058 | A1 | 12/2011 | Herr et al. |
| 2014/0129753 | A1 | 5/2014 | Schuette et al. |
| 2014/0281040 | A1 | 9/2014 | Liu |
| 2014/0372657 | A1 | 12/2014 | Jones et al. |

(Continued)

*Primary Examiner* — Kevin Verbrugge
(74) *Attorney, Agent, or Firm* — Volpe and Koenig, P.C.

(57) ABSTRACT

Described herein is a method and system for directly accessing and transferring data between a first memory architecture and a second memory architecture associated with a graphics processing unit (GPU) by treating the first memory architecture, the second memory architecture and system memory as a single physical memory, where the first memory architecture is a non-volatile memory (NVM) and the second memory architecture is a local memory. Upon accessing a virtual address (VA) range by a processor, the requested content is paged in from the single physical memory and is then redirected by a virtual storage driver to the second memory architecture or the system memory, depending on which of the GPU or CPU triggered the access request. The memory transfer occurs without awareness of the application and the operating system.

21 Claims, 9 Drawing Sheets

(56) References Cited

U.S. PATENT DOCUMENTS

2015/0324118 A1 11/2015 McCambridge et al.
2016/0098227 A1 4/2016 Bandic et al.
2016/0364829 A1 12/2016 Apodaca et al.

METHOD AND APPARATUS FOR INTEGRATION OF NON-VOLATILE MEMORY

CROSS-RELATED APPLICATIONS

This application is a continuation of, and claims the priority benefit of U.S. patent application Ser. No. 15/389,596, filed on Dec. 23, 2016, the entire contents of which are incorporated by reference as if fully set forth herein. This application is related to co-pending U.S. application entitled "Apparatus for Connecting Non-volatile Memory locally to a GPU through a Local Switch", having U.S. patent application Ser. No. 15/389,747, filed on Dec. 23, 2016, the entire contents of which are incorporated by reference as if fully set forth herein. This application is related to co-pending U.S. application entitled "Method and Apparatus for Accessing Non-volatile Memory As Byte Addressable Memory", having U.S. patent application Ser. No. 15/389,811, filed on Dec. 23, 2016, the entire contents of which are incorporated by reference as if fully set forth herein. This application is related to U.S. Application entitled "Method and Apparatus for Integration of Non-volatile Memory", having U.S. patent application Ser. No. 15/389,908, filed on Dec. 23, 2016, and issued as U.S. Pat. No. 10,007,464 on Jun. 26, 2018, the entire contents of which are incorporated by reference as if fully set forth herein.

BACKGROUND

A graphics processing unit (GPU) may be nominally configured with a certain amount of local or dedicated memory, (hereinafter referred to as local), to service operations performed on the GPU. For example, the local memory may be dynamic random access memory. Certain applications may require the transfer of data from non-volatile memory (NVM) to the local memory. In this scenario, an operating system (OS), display driver, device driver or similar hardware/software entity of a host computing system controls or manages the data transfer process. This data transfer process entails a two hop process; first from the NVM to a host memory, and then from the host memory to the local memory. This involves at least a root complex, which increases traffic and congestion.

A graphics processing unit (GPU) may be nominally configured with a certain amount of local or dedicated memory, (hereinafter referred to as local), to service operations performed on the GPU. For example, the local memory may be dynamic random access memory. The GPU, which is a byte addressable device, may also have access to non-volatile memory (NVM), which is a type of block addressable memory. In the event that the GPU or certain applications require a transfer of data between the NVM and the local memory, an operating system (OS), display driver, device driver or similar hardware/software entity running on a host computing system typically controls or manages the data transfer process. This data transfer process entails a two hop process; first from the NVM to system memory, and then from the system memory to the local memory. In particular, the NVM data must be first transferred into the system memory via a NVM controller's block input/output (I/O) file transfer mechanism. The GPU can then access the data from the system memory. This involves at least using the system memory and results in increased traffic and congestion.

BRIEF DESCRIPTION OF THE DRAWINGS

A more detailed understanding may be had from the following description, given by way of example in conjunction with the accompanying drawings wherein.

DETAILED DESCRIPTION

Described herein is a method and system for directly accessing and transferring data between a first memory architecture and a second memory architecture associated with a graphics processing unit (GPU) or a discrete GPU (dGPU). The first memory architecture can be a non-volatile memory (NVM) or other similarly used memories, for example, along with associated controllers. The second memory architecture can be a local memory, a high bandwidth memory (HBM), a double data rate fourth-generation synchronous dynamic random-access memory (DDR4), a double data rate type five synchronous graphics random access memory (GDDR5), a hybrid memory cube or other similarly used memories, for example, along with associated controllers. For purposes of illustration and discussion, the terms NVM and local memory will be used in the description without limiting the scope of the specification and claims.

In particular, the method describes transferring data directly between the NVM and the local memory, which bypasses interaction with a system memory of a processor and a host system root complex. A transfer command is sent from the processor, (or a host agent in the GPU or dGPU), to a NVM controller. The NVM controller initiates transfer of the data directly between the NVM and the local memory. The method bypasses: 1) a host system root complex; and 2) storing the data in the system memory and then having to transfer the data to the local memory or NVM. In effect, a multi-hop data transfer can be accomplished in a single hop.

Figure 1:
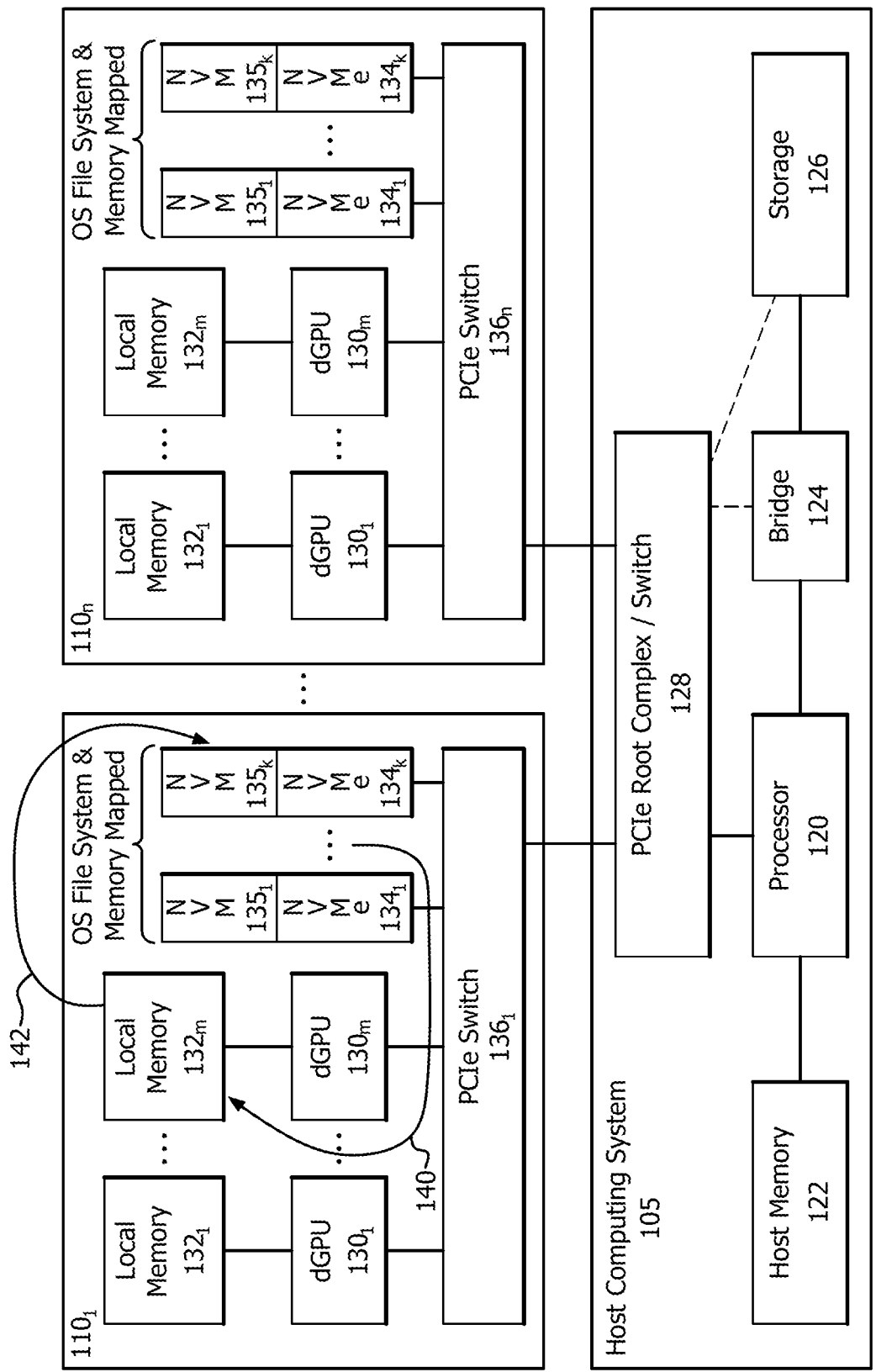
FIG. 1 is a processing system with a host computing system and solid state graphics (SSG) cards in accordance with certain implementations.

FIG. 1 shows an example processing system 100 in accordance with certain implementations. The processing system 100 can include a host computing system 105 that is connected to one or more solid state graphics (SSG) boards or cards 110$_1$ to 110$_n$. The host computing system 105 includes a processor 120, such as for example a central processing unit (CPU), which may be connected to, or in communication with, a host memory 122 such as for example random access memory (RAM). The processor 120 can include an operating system (OS), a device driver and other nominal elements. The processor 120 can also be connected to, or in communication with, a number of components, including but not limited to, a bridge 124 and storage 126. The components shown are illustrative and other components may also be connected to or be in communication with the CPU 105. The components may be connected to or be in communication with the processor 120 using, for example, a high-speed serial computer expansion bus, such as but not limited to, a Peripheral Component Interconnect Express (PCIe) root complex and switch (collectively PCIe switch) 128. The PCIe switch 128 is shown for purposes of illustration and other electrical or communication interfaces may be used.

Each SSG board $110_1$ to $110_n$ includes a PCIe switch $136_1$ to $136_n$ for interfacing with PCIe switch 128. Each PCIe switch $136_1$ to $136_n$ can be connected to or in communication with one or more non-volatile memory (NVM) controllers $134_1$ to $134_k$, such as for example, a NVM Express (NVMe) or Non-Volatile Memory Host Controller Interface Specification (NVMHCI) device, for accessing associated NVMs $135_1$ to $135_k$ and can also be connected to one or more dGPUs $130_1$ to $130_m$. Each dGPU $130_1$ to $130_m$ is further connected to an associated local memory $132_1$ to $132_m$. Each NVM controller $134_1$ to $134_k$ can manage and access an associated NVM $135_1$ to $135_k$ and in particular, can decode incoming commands from host computing system 105 or dGPU $130_1$ to $130_m$ as described herein below. The SSG board described herein is illustrative and other configurations can be used without departing from the scope of the description and claims. Further configurations are described in co-pending application entitled "Method and Apparatus for Connecting Non-volatile Memory locally to a GPU through a Local Switch, U.S. patent application Ser. No. 15/389,747 which is incorporated by reference as if fully set forth.

Operationally, when a dGPU of the one or more dGPUs $130_1$ to $130_m$ is executing commands that require data transfer between an associated local memory and one or more NVMs $135_1$ to $135_k$, then the processor 120 can instruct or enable direct data transfer from the associated local memory $132_1$ to $132_m$ to one or more NVMs $135_1$ to $135_k$ (arrow 142) or from one or more NVMs $135_1$ to $135_k$ to the associated local memory (arrow 140). The direct data transfer can be initiated by an appropriate NVM controller $134_1$ to $134_k$ via a local PCIe switch, such as for example, PCIe switch $136_1$ to $136_n$. In an implementation, the dGPU can have a hardware agent that can instruct the direct data transfer. This peer-to-peer data transfer or access can alleviate the disadvantages discussed herein. As shown in FIG. 1, this process uses a single hop data transfer process, from local memory $132_1$ to $132_m$ to NVM $135_1$ to $135_k$. That is, the data transfer can be executed locally with respect to the dGPU without involvement of processor 120 or PCIe root complex/switch 128 during execution of the data transfer. Moreover, since data transfer to and from local memory $132_1$ to $132_m$ is initiated by an appropriate NVM controller $134_1$ to $134_k$. This may increase the efficiency of the processor 120 as it is not involved in the actual transfer of the data, increase the efficiency of dGPU $130_1$ to $130_m$ as it is not using resources, such as for example memory management resources for initiating and executing the data transfer, decrease system latency and increase system performance.

Figure 2:
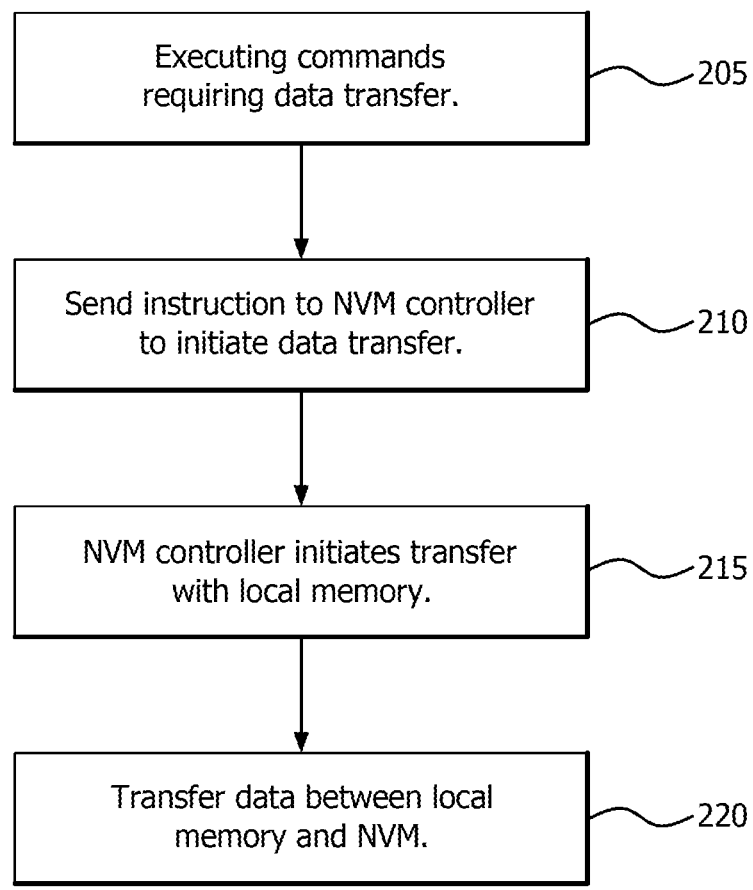
FIG. 2 is a flow diagram using the processing system of FIG. 1 in accordance with certain implementations.

FIG. 2, in concert with FIG. 1, shows an example flowchart 200 for transferring data directly between local memory $132_1$ to $132_m$ and one or more NVMs $135_1$ to $135_k$. As commands are executed by one or more dGPUs $130_1$ to $130_m$, certain commands may need access between to one or more NVMs $135_1$ to $135_k$ (step 205). A data transfer command is sent by a processor 120 or hardware agents in one or more dGPUs $130_1$ to $130_m$ to appropriate NVM controllers $134_1$ to $134_k$ (step 210). The appropriate NVM controller $134_1$ to $134_k$ initiates the data transfer (step 215). The data is transferred between local memory $132_1$ to $132_m$ and one or more NVMs $135_1$ to $135_k$ via a local PCIe switch $136_1$ to $136_n$, as appropriate (step 220).

Figure 3:
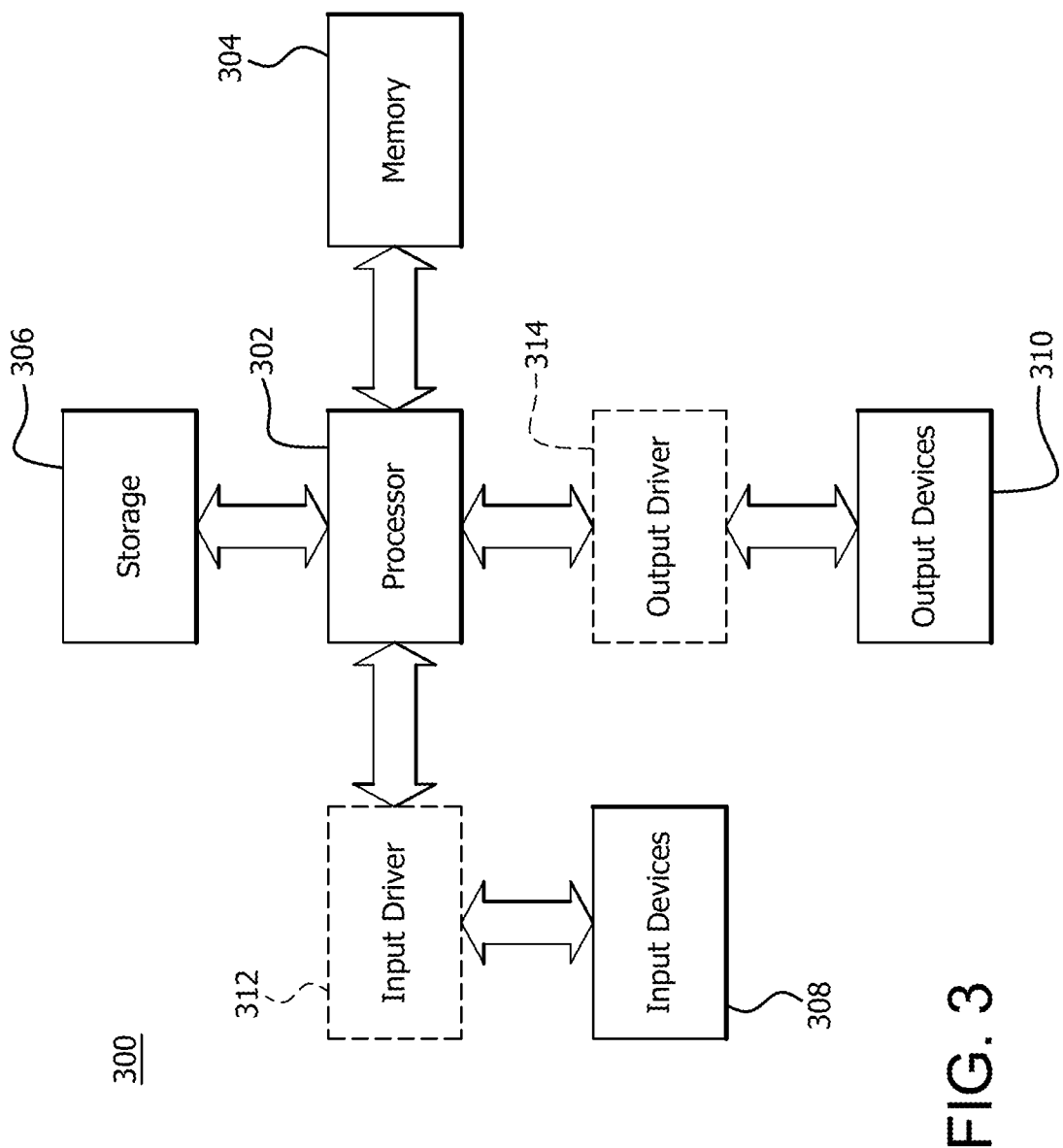
FIG. 3 is a block diagram of an example device in which one or more disclosed implementations may be implemented.

FIG. 3 is a block diagram of an example device 300 in which one portion of one or more disclosed implementations may be implemented. The device 300 may include, for example, a head mounted device, a server, a computer, a gaming device, a handheld device, a set-top box, a television, a mobile phone, or a tablet computer. The device 300 includes a processor 302, a memory 304, a storage 306, one or more input devices 308, and one or more output devices 310. The device 300 may also optionally include an input driver 312 and an output driver 314. It is understood that the device 300 may include additional components not shown in FIG. 3.

The processor 302 may include a central processing unit (CPU), a graphics processing unit (GPU), a CPU and GPU located on the same die, or one or more processor cores, wherein each processor core may be a CPU or a GPU. The memory 304 may be located on the same die as the processor 302, or may be located separately from the processor 302. The memory 304 may include a volatile or non-volatile memory, for example, random access memory (RAM), dynamic RAM, or a cache.

The storage 306 may include a fixed or removable storage, for example, a hard disk drive, a solid state drive, an optical disk, or a flash drive. The input devices 308 may include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 310 may include a display, a speaker, a printer, a haptic feedback device, one or more lights, an antenna, or a network connection (e.g., a wireless local area network card for transmission and/or reception of wireless IEEE 802 signals).

The input driver 312 communicates with the processor 302 and the input devices 308, and permits the processor 302 to receive input from the input devices 308. The output driver 314 communicates with the processor 302 and the output devices 310, and permits the processor 302 to send output to the output devices 310. It is noted that the input driver 312 and the output driver 314 are optional components, and that the device 300 will operate in the same manner if the input driver 312 and the output driver 314 are not present.

In general, in an implementation, a method for transferring data includes a data transfer command being received by a first memory architecture controller associated with a first memory architecture when a graphics processing unit (GPU) needs access to the first memory architecture. The first memory architecture controller initiates a data transfer directly from the first memory architecture to a second memory architecture associated with the GPU. Data is then transferred directly from the first memory architecture to the second memory architecture associated with the GPU using a local switch and bypassing a host processor switch. In an implementation, the data transfer command is sent by a host processor. In an implementation, the data transfer command is sent by a hardware agent of the at least one GPU. In an implementation, another data transfer command is received by the first memory architecture controller associated with the first memory architecture when the GPU needs access to the first memory architecture. The first memory architecture controller initiates a data transfer directly from the second memory architecture to the first memory architecture. Data is then transferred from the second memory architecture to the first memory architecture associated with the GPU using the local switch and bypassing the host processor switch.

In an implementation, an apparatus for transferring data includes at least one graphics processing unit (GPU), a second memory architecture associated with each GPU, at least one first memory architecture, a first memory architecture controller connected with each first memory architecture and a local switch coupled to each first memory architecture controller and the at least one GPU. The at least one first memory architecture controller receives a data transfer command when the at least one GPU needs access to a first memory architecture associated with the at least one first memory architecture controller, directly initiates a data transfer directly from the first memory architecture to the second memory architecture associated with the at least one GPU and transfers data directly from the first memory architecture to the second memory architecture associated with the at least one GPU using the local switch and bypassing a host processor switch. In an implementation, the data transfer command is sent by a host processor. In an implementation, the data transfer command is sent by a hardware agent of the at least one GPU. In an implementation, the at least one first memory architecture controller receives another data transfer command when the at least one GPU needs access to the first memory architecture associated with the at least one first memory architecture controller, initiates a data transfer directly from the second memory architecture associated with the at least one GPU to the first memory architecture associated with the at least one first memory architecture controller and transfers data directly from the second memory architecture associated with the at least one GPU to the first memory architecture associated with the at least one first memory architecture controller using the local switch and bypassing the host processor switch.

In an implementation, a system for transferring data includes a host processor including a processor and a host processor switch and at least one solid state graphics (SSG) card connected to the host processor. Each SSG card includes at least one graphics processing unit (GPU), a second memory architecture associated with each GPU, at least one first memory architecture, a first memory architecture controller connected with each first memory architecture, and a local switch coupled to each first memory architecture controller and the at least one GPU. In an implementation, the host processor switch is connected to each local switch. In an implementation, the at least one first memory architecture controller receives a data transfer command when the at least one GPU needs access to a first memory architecture associated with the at least one first memory architecture controller, directly initiates a data transfer directly from the first memory architecture to the second memory architecture associated with the at least one GPU, and transfers data directly from the first memory architecture to the second memory architecture associated with the at least one GPU using the local switch and bypassing the host processor switch. In an implementation, the data transfer command is sent by the processor. In an implementation, the data transfer command is sent by a hardware agent of the at least one GPU. In an implementation, the at least one first memory architecture controller receives another data transfer command when the at least one GPU needs access to the first memory architecture associated with the at least one first memory architecture controller, initiates a data transfer directly from the second memory architecture associated with the at least one GPU to the first memory architecture associated with the at least one first memory architecture controller, and transfers data directly from the second memory architecture associated with the at least one GPU to the first memory architecture associated with the at least one first memory architecture controller using the local switch and bypassing the host processor switch.

In an implementation, a computer readable non-transitory medium including instructions which when executed in a processing system cause the processing system to execute a method for transferring data. The method includes a data transfer command being received at a first memory architecture controller associated with a first memory architecture when a graphics processing unit (GPU) needs access to the first memory architecture. A data transfer initiated by the first memory architecture controller directly from the first memory architecture to a second memory architecture associated with the GPU. Data is then transferred directly from the first memory architecture to the second memory architecture associated with the GPU using a local switch and bypassing a host processor switch. In an implementation, the data transfer command is sent by a host processor. In an implementation, the data transfer command is sent by a hardware agent of the at least one GPU. In an implementation, another data transfer command is received by the first memory architecture controller when the at least one GPU needs access to the first memory architecture associated with the at least one first memory architecture controller. A data transfer is initiated by the first memory architecture controller to directly transfer from the second memory architecture associated with the at least one GPU to the first memory architecture associated with the at least one first memory architecture controller. Data is then directly transferred from the second memory architecture associated with the at least one GPU to the first memory architecture associated with the at least one first memory architecture controller using the local switch and bypassing the host processor switch.

In general and without limiting implementations described herein, a computer readable non-transitory medium including instructions which when executed in a processing system cause the processing system to execute a method for transferring data directly from a second memory architecture in a GPU to a first memory architecture.

Described herein is a method and system for directly accessing and transferring data between a first memory architecture and a second memory architecture associated with a graphics processing unit (GPU) or a discrete GPU (dGPU) by treating the first memory architecture and the second memory architecture as a part of physical memory, where the first memory architecture can be a non-volatile memory (NVM) or other similarly used memories, for example, along with associated controllers. The second memory architecture can be a device local memory e.g., a high bandwidth memory (HBM), a double data rate fourth-generation synchronous dynamic random-access memory (DDR4), a double data rate type five synchronous graphics random access memory (GDDR5), a hybrid memory cube or other similarly used memories, for example, along with associated controllers. For purposes of illustration and discussion, the terms NVM and local memory will be used in the description without limiting the scope of the specification and claims.

In particular, the system includes a physical memory that consists of the first memory architecture, the second memory architecture and system memory. In general, an application running on a central processing unit (CPU), graphics processing unit (GPU) or both can result in opening or accessing a file and allocating a virtual address (VA) range or space relative to the size of the file. The file is then mapped into the allocated VA range. In the event of an access, the VA range will be hit by the relevant load or store command from one of the CPU or GPU. Since the VA is not by default mapped physically to a portion of memory, the load or store command will generate a fault serviced by the operating system (OS) running on the CPU; the OS will catch the fault and page in the appropriate content from the first memory architecture, for example. The content is then redirected by a virtual storage driver to the second memory architecture or the system memory, depending on which of the GPU or CPU triggered the access request. Consequently, the memory transfer occurs without awareness of the application and the OS. This substantially simplifies the access to the first memory architecture from the GPU and the CPU perspective since the first memory architecture appears as regular low-latency memory though physically it is located in the "correct" memory, (i.e. the physical memory effectively includes the first memory architecture, the second memory architecture and system memory), for the access, (either system memory for the CPU or second memory architecture for the GPU). Collisions to the same VA range can be handled by the page fault servicing code by a coarse grain protocol, for example.

Figure 4:
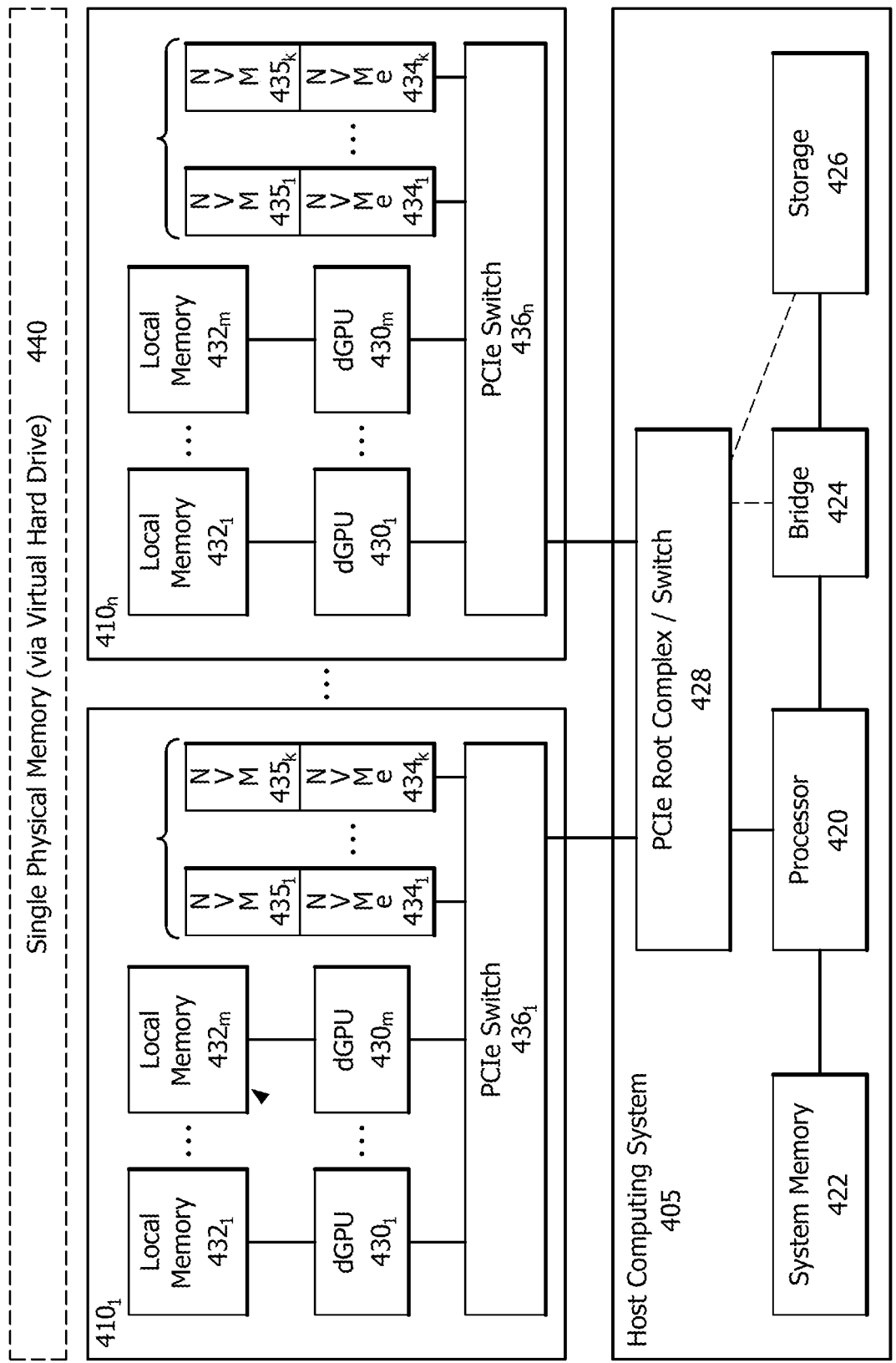
FIG. 4 illustrates a processing system with a host computing system and a solid state graphics (SSG) card in accordance with certain implementations.

FIG. 4 shows an example processing system 400 in accordance with certain implementations. The processing system 400 can include a host computing system 405 that is connected to one or more solid state graphics (SSG) boards or cards $410_1$ to $410_n$. The host computing system 405 includes a host processor 420, such as for example a central processing unit (CPU), which may be connected to, or in communication with, a system memory 422 such as for example random access memory (RAM). The host processor 420 can also be connected to, or in communication with, a number of components, including but not limited to, a bridge 424 and storage 426. The components shown are illustrative and other components may also be connected to or be in communication with the CPU 405. The components may be connected to or be in communication with the host processor 420 using, for example, a high-speed serial computer expansion bus, such as but not limited to, a Peripheral Component Interconnect Express (PCIe) root complex and switch (collectively PCIe switch) 428. The PCIe switch 428 is shown for purposes of illustration and other electrical or communication interfaces may be used.

Figure 4A:
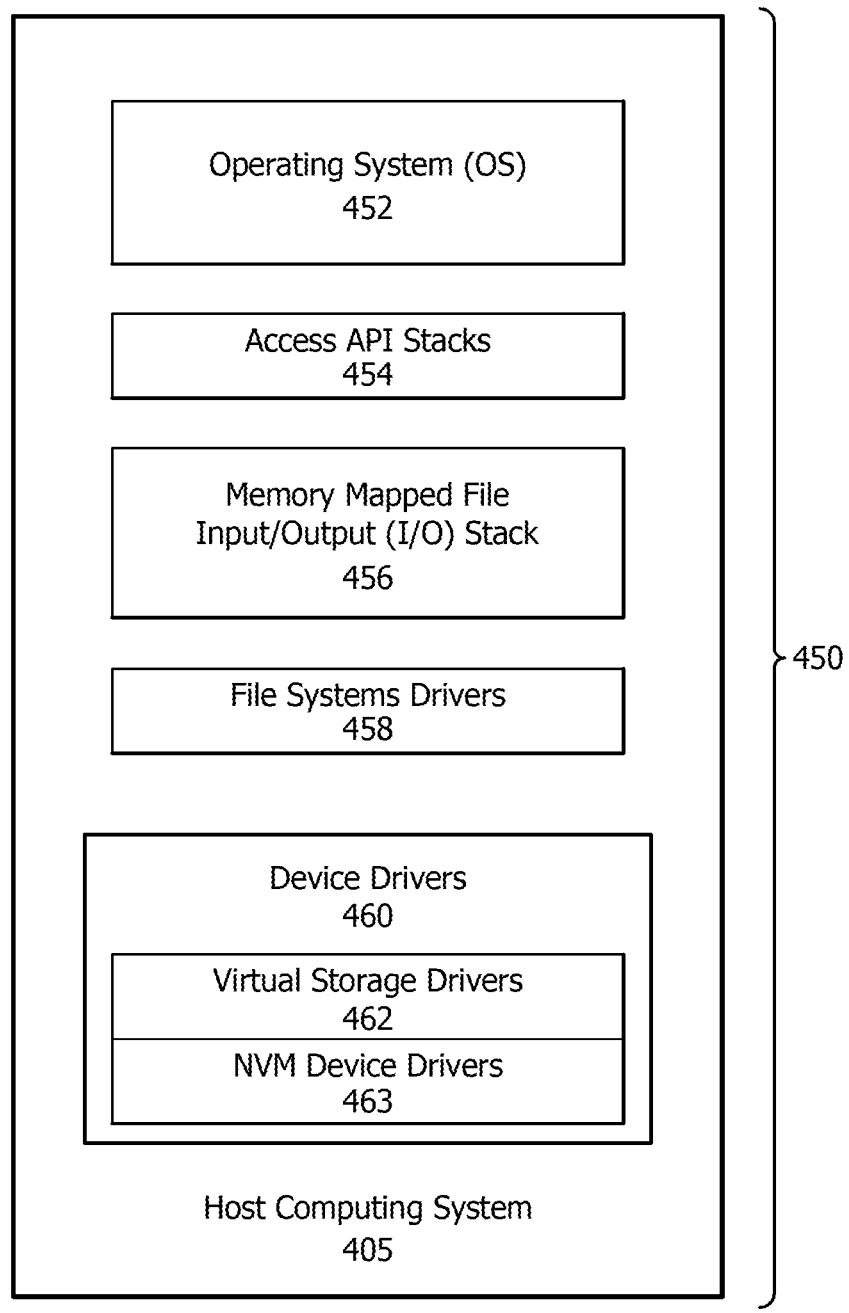
FIG. 4A illustrates a software stack for the processing system of FIG. 4 in accordance with certain implementations.

Referring now to FIG. 4A, a software stack 450 runs on host computing system 405, where the software stack 450 includes, but is not limited to, an operating system (OS) 452, access application program interface (APIs) stacks 454 for accessing memory and file systems, memory mapped file input/output (I/O) stack 456 for mapping file systems and raw disk content, file system drivers 458, memory management for controlling and configuring file systems, formatting volumes, and performing other similar functions, device drivers 460 for accessing memory and other nominal elements. In an implementation, device drivers 460 can include a virtual storage driver 462, which uses a storage driver protocol abstraction that enables GPU direct memory access (DMA) processing in the background for data transfer and which requires no strict association with a particular hardware type. In an implementation, device drivers 460 can include NVM device drivers 463, which can be used for accessing NVMs.

In an implementation, memory mapped file I/O stack 456 maps storage file or raw disk content into application VA range. In a general example, a VA range allocation is created for a process/application by OS 452, which commits system memory 422 as access cache. On access by host processor 420, for example, to a VA range within the file mapping, OS 452 pages in appropriate sections into system memory 422 from storage based on relative location. On write to the system memory 422, OS 452 updates the access cache and eventually flushes content to backend storage as needed. In this instance, backend storage refers to a large storage device that receives the data when the data is not in use. In general, backend storage is used in demand paging scenarios where the data currently in process is loaded into HBM RAM, for example, and data that has been updated and does not need to be processed any further is written back to the storage device, (e,g, a non-volatile memory (NVM) Express (NVMe) as described herein below). OS 452 efficiently manages the data through a file system and communication with other components of the storage stack like storage interface drivers (RAIDx drivers, SATA, NVMe drivers, etc) and system memory commit and un-commit commands. In an implementation, a GPU with shared virtual memory (SVM) can access the same virtual address mappings as host processor 420.

Referring back to FIG. 4, each SSG board $410_1$ to $410_n$ includes a PCIe switch $436_1$ to $436_n$ for interfacing with PCIe switch 428. Each PCIe switch $436_1$ to $436_n$ can be connected to or be in communication with, (collectively "connected to"), one or more non-volatile memory (NVM) controllers $434_1$ to $434_k$, such as for example, a NVM Express (NVMe) or Non-Volatile Memory Host Controller Interface Specification (NVMHCI) device, for accessing associated NVMs $435_1$ to $435_k$ and can also be connected to one or more dGPUs $430_1$ to $430_m$. Each dGPU $430_1$ to $430_m$ is further connected to an associated device local memory $432_1$ to $432_m$. Each NVM controller $434_1$ to $434_k$ can manage and access an associated NVM $435_1$ to $435_k$ and in particular, can decode incoming commands from host computing system 405 or dGPU $430_1$ to $430_m$. The system and SSG board described herein are illustrative and other configurations can be used without departing from the scope of the description and claims. Further configurations are described in co-pending application entitled "Method and Apparatus for Connecting Non-volatile Memory locally to a GPU through a Local Switch, having U.S. patent application Ser. No. 15/389,747, filed on Dec. 23, 2016, which is incorporated by reference as if fully set forth.

In an implementation, a SSG board $410_1$ to $410_n$ can implement a redundant array of independent disks (RAID) architecture to provide parallelized or distributed access to each NVM controller $434_1$ to $434_k$ and NVM $435_1$ to $435_k$ as described in co-pending application entitled "Method and Apparatus for Connecting Non-volatile Memory locally to a GPU through a Local Switch", having U.S. patent application Ser. No. 15/389,747, filed on Dec. 23, 2016, which is incorporated by reference as if fully set forth. For example, in a SSG board $410_1$ to $410_n$, a NVM controller $434_1$ to $434_k$ and NVM $435_1$ to $435_k$ can be configured for 4 kB access stripes for a total of 16 kB block default view. In an implementation, a bank selection register can be used for higher address selection on NVM $435_1$ to $435_k$.

In an implementation, a NVM controller $434_1$ to $434_k$ and NVM $435_1$ to $435_k$ can be accessed by a dGPU $430_1$ to $430_m$ via DMA commands. In an implementation, efficient processor 420 and/or peer-to-peer (P2P) access can be implemented using appropriately size or resizable base address register (BAR) apertures in an appropriate PCIe switch $436_1$ to $436_n$ to access, for example, a NVM controller $434_1$ to $434_k$ and NVM $435_1$ to $435_k$. This allows processor 420 mapping of memory for efficient, large data block transfers from processor 420, and P2P devices via remote DMA. Virtual storage driver 462 can then map data to appropriate block in NVM controller $434_1$ to $434_k$ and NVM $435_1$ to $435_k$ via a migration or mirroring scheme as described herein. In an implementation, streaming and block access modes can be implemented.

In an implementation, a dGPU $430_1$ to $430_m$ can have a physical address bit that selects SSG board internal address space or board external address space and can be used to identify dGPU or host computing based access. In an implementation, command queues, and jump buffers in frame buffer memory can be accessible to each NVM controller $434_1$ to $434_k$ and NVM $435_1$ to $435_k$. In an implementation, dGPU $430_1$ to $430_m$ virtual address mapping allows linear mapping of content into shader or application virtual address space, with virtual storage driver 462 mapping physical content as described herein.

In an implementation, system memory 422, each of NVMs $435_1$ to $435_k$, and each of local memories $432_1$ to $432_m$ is treated as a single physical memory using, for example, a file format such as virtual hard disk (VHD). In an implementation, files and/or data can span multiple SSG boards $410_1$ to $410_n$. As described herein, this single physical memory in combination with a virtual memory infrastructure provided by the memory mapped file I/O stack 456, enables virtual storage driver 462 to redirect content based on whether host processor 420 or one of dGPU $430_1$ to $430_m$ sent the access request or data transfer command. That is, virtual storage driver 462 provides input/output (I/O) for processing system 400. In particular, memory mapped file I/O stack 456 allows raw disc access, or file system mapping as needed, where OS 452 updates NVMs $435_1$ to $435_k$ content, and creates a virtual address file view. Moreover, memory mapped file I/O stack 453 allows RAID setup management by OS 452 and use of NVM device drivers 463.

Figure 5:
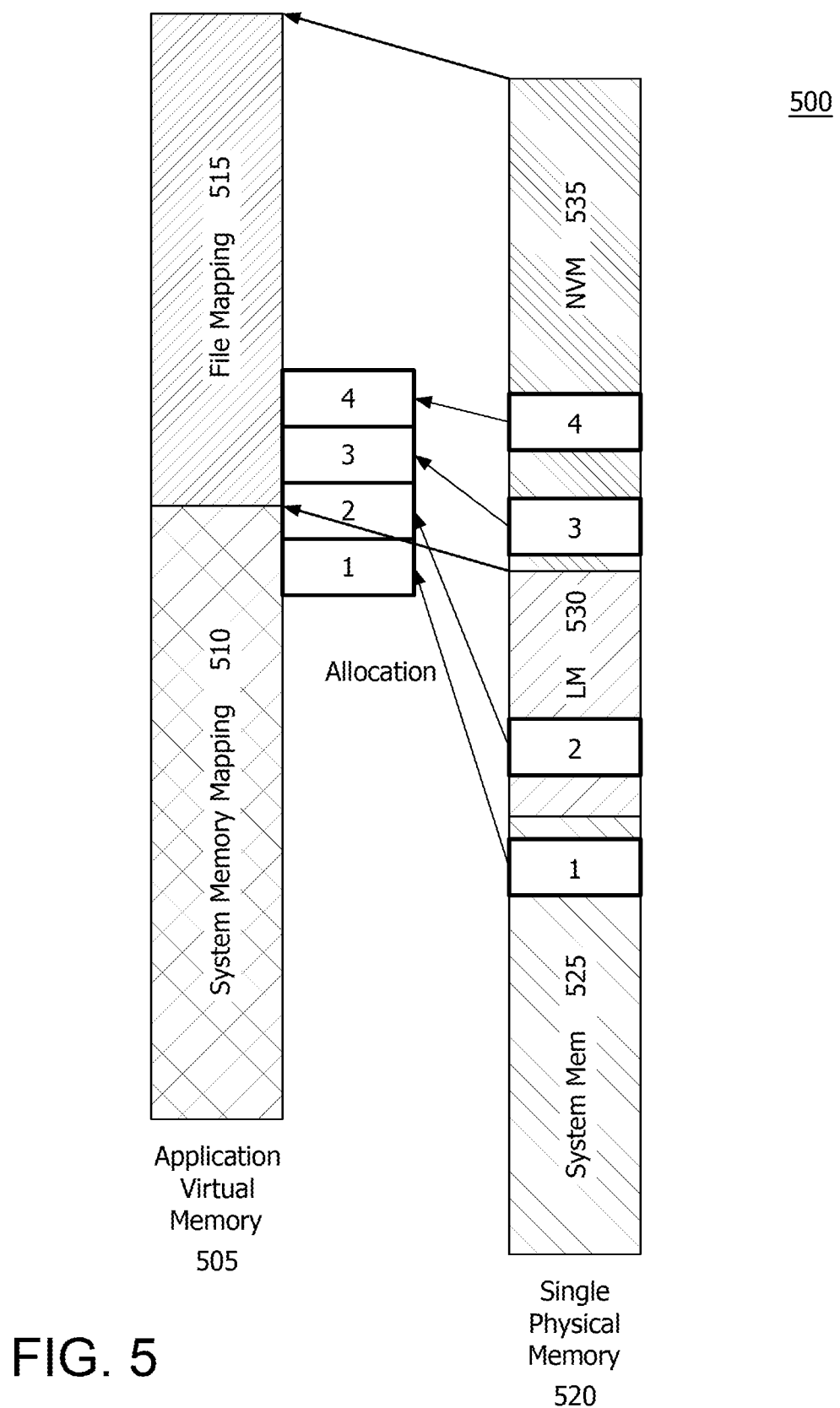
FIG. 5 illustrates a memory mapping using the processing system of FIG. 1 in accordance with certain implementations.

FIG. 5 illustrates a memory mapping 500 using the processing system of FIG. 4 in accordance with certain implementations. As noted herein, an application VA 505 (or application virtual memory) is created and allocated for an application or process. In an example, application VA 505 includes a system memory mapping 510 and a file mapping 515. Upon an access request, content is paged in from single physical memory 520, where single physical memory 520 includes system memory 525, local memory (LM) 530 and NVM 535. For example, content for page 1 is from system memory 525, content for page 2 is from local memory 530 and content from pages 3 and 4 are from NVM 535. As illustrated, an application still sees one (large) virtual address space for data with both GPU and CPU code.

Referencing now also to FIG. 4, virtual storage driver 462 permits the GPU to abstract single physical memory 520 appropriately. In particular, GPU local memory 530 is referenced via virtual addresses and, as noted herein, a memory mirroring scheme or a redirection scheme can be used to accomplish same. In the memory mirroring scheme implementation, the data is duplicated and redirected to local memory 530 in addition to system memory 525. Both the GPU and CPU have access to their own content with fast system memory or local memory updates, respectively, using a coarse grain access protocol to flush updated content to the other memory, which is coordinated via virtual storage driver 462. This scheme can benefit multi-GPU processing where system memory 525 contains global mapping and GPUs contain their local version of the data, and allows scaling of the scheme to enormously huge files (>2 TByte) with additional SSG cards in the system containing a portion of the data.

In the redirection scheme, the content is redirected to local memory 530 by the virtual storage driver 462 instead of the data being direct memory accessed (DMA'd) by NVM device 535 or storage drivers to system memory 525. This scheme supports multiple GPU P2Ps provided that the framebuffer aperture is large enough in the PCIe switch, (i.e. PCIe switch $436_1$-$436_n$ and PCIe switch 428).

In general and with respect to both schemes described above, PCIe switches implement apertures to provide access to PCIe devices. Accordingly, device local memory 432 (or local memory 530) can be mapped into system memory 422 (or system memory 525) via a "host access-GPU" aperture in PCIe switch 428. Therefore the DMA access is redirected to that aperture to transfer the data into device local memory 432 (or local memory 530).

Figure 6:
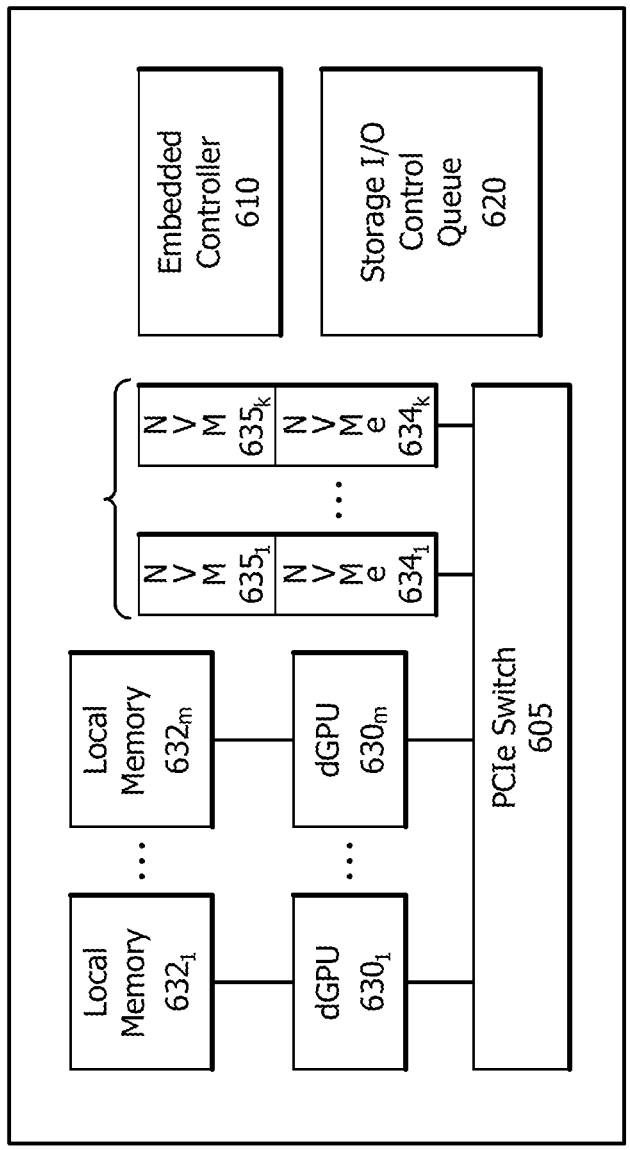
FIG. 6 illustrates a solid state graphics (SSG) card in accordance with certain implementations.

FIG. 6 a solid state graphics (SSG) board or card 600 which can be used in processing system 400 in accordance with certain implementations. SSG board 600 includes a PCIe switch 605 for interfacing with a PCIe switch on a host computing system 405, for example. PCIe switch 605 is further connected to one or more NVM controllers $634_1$ to $634_k$, such as for example, a NVMe or NVMHCI device, for accessing associated NVMs $635_1$ to $635_k$ and can also be connected to one or more dGPUs $630_1$ to $630_m$. Each dGPU $630_1$ to $630_m$ is further connected to an associated device local memory $632_1$ to $632_m$. Each NVM controller $634_1$ to $634_k$ can manage and access an associated NVM $635_1$ to $635_k$ and in particular, can decode incoming commands from host computing system 405 or dGPU $630_1$ to $630_m$.

SSG board 600 further includes an embedded controller 610 that offloads certain functions from NVM controllers $634_1$ to $634_k$. For example, embedded controller 610 can perform storage management for NVMs $635_1$ to $635_k$, RAID array management, file system management and DMA transfer operations. In particular, by having a high-level file system defined in embedded controller 610, embedded controller 610 can manage multiple resources, can size memory/storage to map with GPU resources, can look like network storage from a host system and can access raw files without regard to file system reference, (i.e. embedded controller 610 can simply use a handle). In this implementation, embedded controller 610 performs as a frontend for host computing system 405, for example, that follows the Heterogeneous System Architecture (HSA) accelerator dispatch model.

Embedded controller 610 enables offloading high-throughput work from the host CPUs and enables dGPU $630_1$ to $630_m$ to dispatch requests to NVM $635_1$ to $635_k$ at a file system level, with embedded controller 610 managing the file system. In particular, embedded controller 610 can run NVMs $635_1$ to $635_k$ as raw RAID storage array on SSG board 600 and provide a single linear addressed storage array view to other components. In an implementation, embedded controller 610 can be implemented or emulated on a dedicated host CPU thread or offloaded to a dedicated embedded system or CPU, (e.g. a field-programmable gate array (FPGA)), without a change to the application visible functionality. Offloading can improve performance and system throughput.

SSG board 600 further includes a storage input/output (I/O) control queue 620, (i.e. an I/O ring), which acts as a programming interface. Storage I/O control queue 620 can be written by a host via Gfx kernel mode driver (KMD) as a Windows Display Driver Model (WDDM) ring as a special engine, host storage driver (i.e. virtual storage miniport), or directly by a GPU kernel. In an implementation, storage I/O control queue 620 can use a lock-free dispatch mechanism similar to an Architected Queuing Language (AQL) queue as used in HSA accelerator dispatch model. In particular, storage I/O control queue 620 can use signals to mark completion as fences and other events to other clients like host, local & peer GPU. For example, storage I/O control queue 620 can use a memory fence or barrier, where the barrier instruction can be an atomic read-modify-write or an atomic store-write instruction to a physical memory location, (which can be referenced through a virtual address mapping provided a software stack 450, for example). The change of state of the physical memory location, (being used for the memory fence), can be directly observed by other accelerators like dGPU $630_1$ to $630_m$, or by a host processor directly, and allows dGPU $630_1$ to $630_m$ or the host processor, for example, to start the next series of processing steps immediately after the physical memory location changed state instead of waiting for an interrupt service routine, (which can delay processing and cause latency). In this instance, storage I/O control queue 620 would not require host queue arbitration to access the particular content or data.

Storage I/O control queue 620 works with embedded controller 610. In particular, embedded controller 610 can provide queue language with packet commands for storage I/O control queue 620 operability. The queue language with packet commands can be used to implement or provide a variety of functions. In an implementation, the packet commands can be issued by GPU kernels, host processing system or via service drivers as remote storage. That is, the packet commands can be processed like file access routines similar to higher-level file I/O, which allows software on the host processing system or GPU to access the data logistically in a way similar to how a computer user accesses a remote network file on a network or cloud storage. This means that the software doesn't need to deal with the intricacies of the data storage but can focus on implementing an efficient processing algorithm.

In an implementation, the packet commands can be used to create/allocate and release storage space on NVMs $635_1$ to $635_k$, for example. In an implementation, the packet commands can be used to issue reads and writes referenced via handles to storage spaces/files. In an implementation, the packet commands can be processed by a small, dedicated embedded OS and runtime, (dealing with the physical layout of the data on the storage devices or NVM, e.g. as linear volume or in a RAID configuration), without changing the host processing system or GPU software if a different implementation materially changes the storage type or physical data layout.

Figure 7:
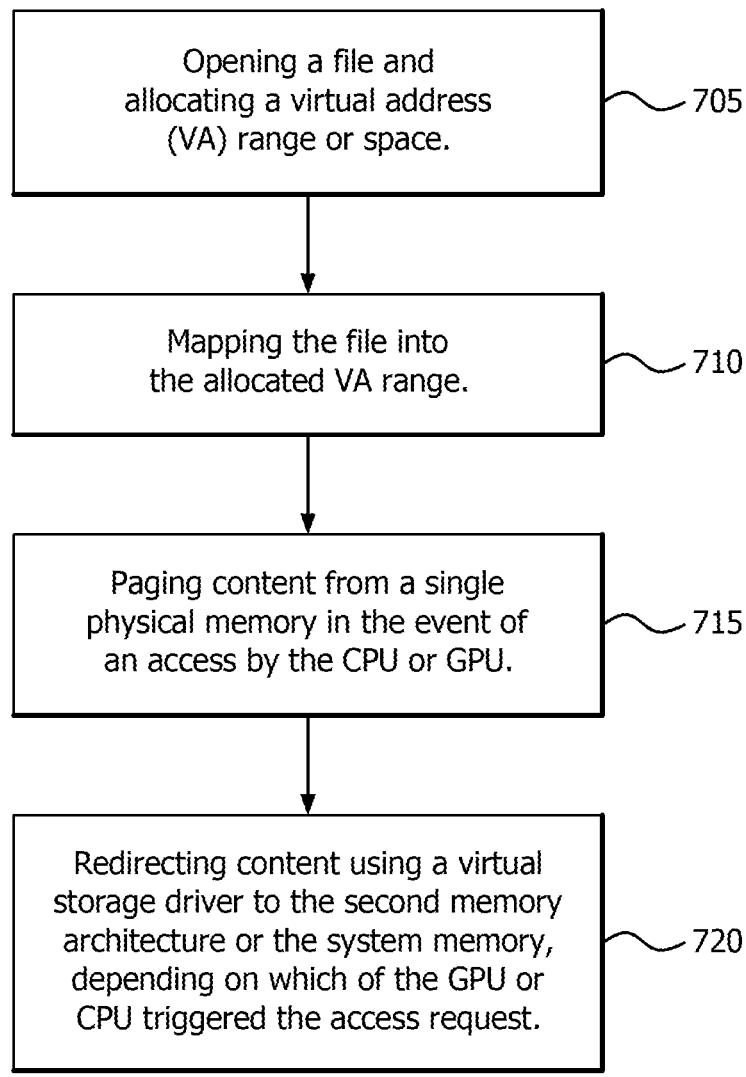
FIG. 7 is a flow diagram using the processing system of FIGS. 4 and 7 in accordance with certain implementations.

FIG. 7, in concert with FIGS. 4, 4A, 5, and 6 shows an example flowchart 700 for transferring data in accordance with certain implementations. An application running on a central processing unit (CPU), graphics processing unit (GPU) or both results in opening or accessing a file and allocating a virtual address (VA) range or space relative to the size of the file (step 705). The file is then mapped into the allocated VA range (step 710). Content is paged in from a single physical memory in the event of an access by the CPU or GPU (step 715), where the single physical memory includes a first memory architecture, a second memory architecture and system memory. The content is redirected by a virtual storage driver to the second memory architecture or the system memory, depending on which of the GPU or CPU triggered the access request (step 720).

Figure 8:
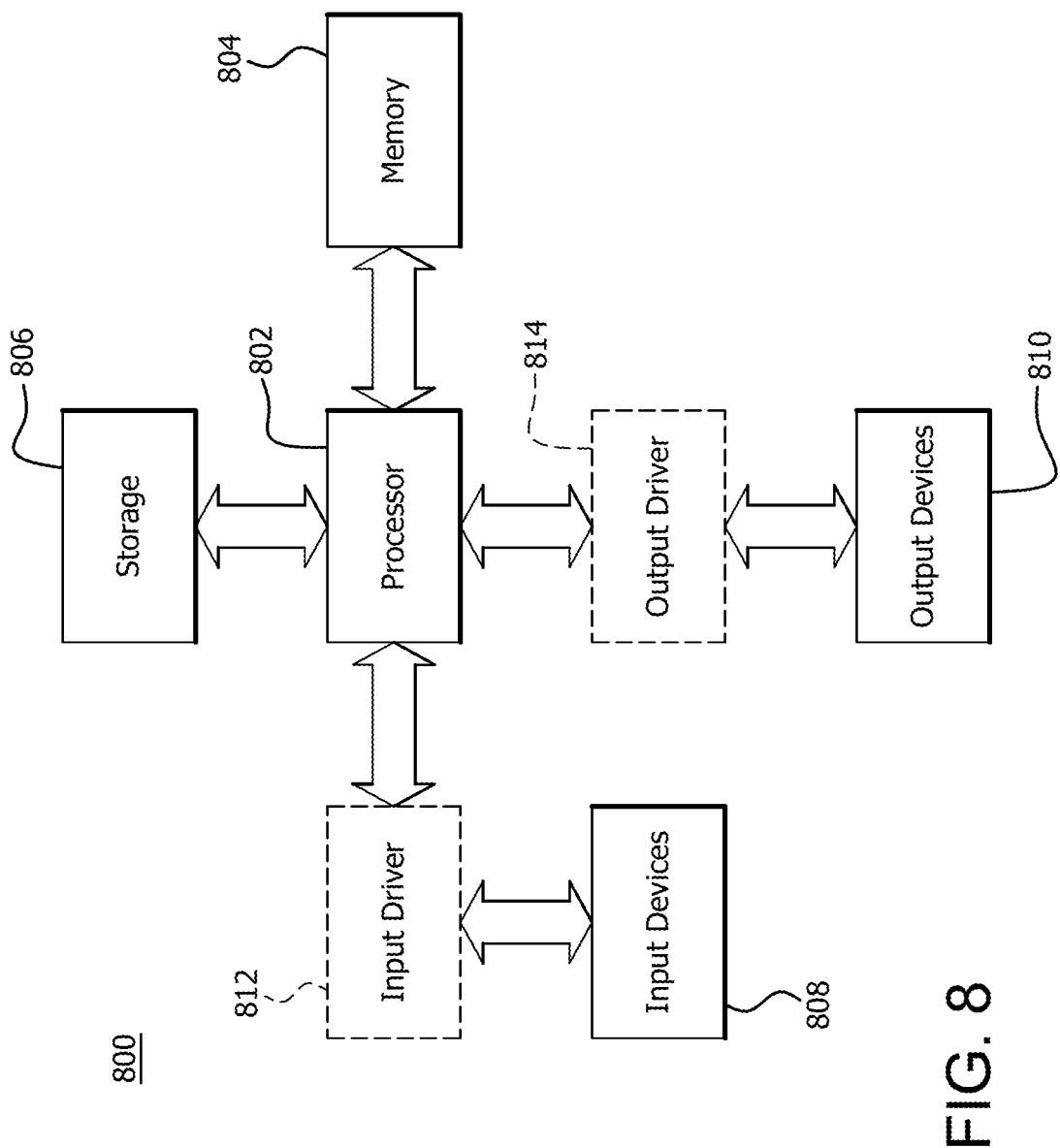
FIG. 8 is a block diagram of an example device in which one or more disclosed implementations may be implemented.

FIG. 8 is a block diagram of an example device 800 in which one portion of one or more disclosed implementations may be implemented. The device 800 may include, for example, a head mounted device, a server, a computer, a gaming device, a handheld device, a set-top box, a television, a mobile phone, or a tablet computer. The device 800 includes a processor 802, a memory 804, a storage 806, one or more input devices 808, and one or more output devices 810. The device 800 may also optionally include an input driver 812 and an output driver 814. It is understood that the device 800 may include additional components not shown in FIG. 8.

The processor 802 may include a central processing unit (CPU), a graphics processing unit (GPU), a CPU and GPU located on the same die, or one or more processor cores, wherein each processor core may be a CPU or a GPU. The memory 804 may be located on the same die as the processor 802, or may be located separately from the processor 802. The memory 804 may include a volatile or non-volatile memory, for example, random access memory (RAM), dynamic RAM, or a cache.

The storage 806 may include a fixed or removable storage, for example, a hard disk drive, a solid state drive, an optical disk, or a flash drive. The input devices 808 may include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 810 may include a display, a speaker, a printer, a haptic feedback device, one or more lights, an antenna, or a network connection (e.g., a wireless local area network card for transmission and/or reception of wireless IEEE 802 signals).

The input driver 812 communicates with the processor 802 and the input devices 808, and permits the processor 802 to receive input from the input devices 808. The output driver 814 communicates with the processor 802 and the output devices 810, and permits the processor 802 to send output to the output devices 810. It is noted that the input driver 812 and the output driver 814 are optional components, and that the device 800 will operate in the same manner if the input driver 812 and the output driver 814 are not present.

It should be understood that many variations are possible based on the disclosure herein. Although features and elements are described above in particular combinations, each feature or element may be used alone without the other features and elements or in various combinations with or without other features and elements.

The methods provided may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the embodiments.

The methods or flow charts provided herein may be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for transferring content, the method comprising:
    accessing a file in response to an application running on a processor, wherein the processor is one of a first type processing unit and a second type processing unit;
    allocating a virtual address (VA) range for the file;
    mapping the file into the allocated VA range;
    paging content from a first location in a single physical memory when an access request by one of the first type processing unit and the second type processing unit to the file results in a fault, wherein the single physical memory includes at least a first memory architecture, a second memory architecture and system memory; and
    redirecting the paged content using a virtual storage driver to a second location in the single physical memory depending on which of the first type processing unit or the second type processing unit triggered the access request.

2. The method of claim 1, wherein the first memory architecture is non-volatile memory (NVM).

3. The method of claim 1, wherein the second memory architecture is memory local to the first type processing unit.

4. The method of claim 3, wherein the second memory architecture is at least one of a high bandwidth memory (HBM), a double data rate fourth-generation synchronous dynamic random-access memory (DDR4), a double data rate type five synchronous graphics random access memory (GDDR5), a hybrid memory cube.

5. The method of claim 1, wherein the first location is one of the first memory architecture, second memory architecture and system memory and the second location is another one of the first memory architecture, second memory architecture and system memory.

6. The method of claim 1, wherein an address bit is used to designate whether the access request is from the first type processing unit or the second type processing unit.

7. The method of claim 1, wherein the single physical memory uses a virtual hard disk file format.

8. The method of claim 1, wherein the first memory architecture includes NVM located on a plurality of solid state graphics (SSG) boards.

9. The method of claim 1, wherein the virtual storage driver uses memory mirroring to store the content at both the second architecture and the system memory.

10. A system for transferring content, comprising:
    a host processing system including at least one processor and system memory;
    at least one solid state graphics (SSG) board connected to the host processing system via a switch, wherein each SSG board includes at least one first memory architecture device connected via a local switch to at least one processing unit, each processing unit connected to a second memory architecture device,
    a single physical memory including each first memory architecture device, each second memory architecture device and the system memory; and
    a virtual storage driver in communication with the host processing system and each of the SSG boards,
    wherein content is paged from a first location in the single physical memory when an access request by one of the at least one processing unit and the at least one processor to a file in a virtual address range results in a fault; and
    wherein the virtual storage driver redirects the paged content to a second location in the single physical memory depending on which of the at least one processing unit and the at least one processor triggered the access request.

11. The system of claim 10, wherein the first memory architecture is non-volatile memory (NVM).

12. The system of claim 10, wherein the second memory architecture is memory local to the processing unit.

13. The system of claim 12, wherein the second memory architecture is at least one of a high bandwidth memory (HBM), a double data rate fourth-generation synchronous dynamic random-access memory (DDR4), a double data rate type five synchronous graphics random access memory (GDDR5), a hybrid memory cube.

14. The system of claim 10, wherein the first location is one of the first memory architecture, second memory architecture and system memory and the second location is another one of the first memory architecture, second memory architecture and system memory.

15. The system of claim 10, wherein an address bit is used to designate whether the access request is from the at least one processing unit and the at least one processor.

16. The system of claim 10, wherein the single physical memory uses a virtual hard disk file format.

17. The system of claim 10, wherein the virtual storage driver uses memory mirroring to store the content at both the second architecture and the system memory.

18. A non-transitory computer readable medium including instructions which when executed in a processing system cause the processing system to execute a method for transferring content, the method comprising the steps of:
    accessing a file in response to an application running on a processor, wherein the processor is one of a first type processing unit and a second type processing unit;
    allocating a virtual address (VA) range for the file;
    mapping the file into the allocated VA range;
    paging content from a first location in a single physical memory when an access request by one of the first type processing unit and the second type processing unit to the file results in a fault, wherein the single physical memory includes at least a first memory architecture, a second memory architecture and system memory; and
    redirecting the paged content using a virtual storage driver to a second location in the single physical memory depending on which of the first type processing unit or the second type processing unit triggered the access request.

19. The non-transitory computer readable medium of claim 18, wherein the first location is one of the first memory architecture, second memory architecture and system memory and the second location is another one of the first memory architecture, second memory architecture and system memory.

20. The non-transitory computer readable medium of claim 18, wherein the first memory architecture is non-volatile memory (NVM) and the second memory architecture is memory local to the first type processing unit.

21. The method of claim 1, further comprising:
receiving, at a first memory architecture controller associated with third memory architecture, a data transfer command when a graphics processing unit (GPU) needs access to the third memory architecture;
initiating, by the first memory architecture controller, a data transfer directly from the third memory architecture to a fourth memory architecture associated with the GPU; and
transferring data directly from the third memory architecture to the fourth memory architecture associated with the GPU using a local switch and bypassing a host processor switch.

\* \* \* \* \*